(12) United States Patent
Ichihashi et al.

(10) Patent No.: US 11,145,222 B2
(45) Date of Patent: Oct. 12, 2021

(54) LANGUAGE LEARNING SYSTEM, LANGUAGE LEARNING SUPPORT SERVER, AND COMPUTER PROGRAM PRODUCT

(71) Applicant: Ken-ichi Kainuma, Tokyo (JP)

(72) Inventors: Norio Ichihashi, Kanagawa (JP); Ken-ichi Kainuma, Tokyo (JP)

(73) Assignee: Ken-ichi Kainuma

( * ) Notice: Subject to any disclaimer, the term of this patent is extended or adjusted under 35 U.S.C. 154(b) by 709 days.

(21) Appl. No.: 15/872,358

(22) Filed: Jan. 16, 2018

(65) Prior Publication Data
US 2018/0137778 A1 May 17, 2018

Related U.S. Application Data

(63) Continuation of application No. PCT/JP2016/074052, filed on Aug. 17, 2016.

(51) Int. Cl.
*G09B 19/06* (2006.01)
*G09B 5/06* (2006.01)
(Continued)

(52) U.S. Cl.
CPC ............ *G09B 19/06* (2013.01); *G09B 5/06* (2013.01); *G09B 5/12* (2013.01); *G09B 7/02* (2013.01);
(Continued)

(58) Field of Classification Search
CPC .......... G09B 19/06; G09B 5/06; G09B 19/04; G09B 5/04; G09B 7/02; G09B 5/065;
(Continued)

(56) References Cited

U.S. PATENT DOCUMENTS

| 8,202,093 B2 * | 6/2012 | Raya ...................... G09B 19/04 283/46 |
| 2004/0034523 A1 * | 2/2004 | Han ........................ G09B 5/02 704/8 |

(Continued)

FOREIGN PATENT DOCUMENTS

| JP | 2002-082598 A | 3/2002 |
| JP | 2002-268537 A | 9/2002 |

(Continued)

*Primary Examiner* — Jerry-Daryl Fletcher
(74) *Attorney, Agent, or Firm* — Harness, Dickey & Pierce, P.L.C.

(57) ABSTRACT

A language learning system including: a learner terminal having a display displaying an image and a sound recording and reproduction device; a learning support server having a memory storing computer-readable instructions and a processor executing the computer-readable instructions so as to: cause the memory to store a model voice of a word with a model pronunciation for a learning language; send the model voice and an image the learner terminal; acquire a learner spoken voice of the word; identify the learner by analyzing the acquired learner voice and evaluate a pronunciation correctness of the acquired learner voice; and send an image indicating an evaluation result of the pronunciation correctness to the learner terminal; and a network that is communicably connected between the learner terminal and the learning support server. The image does not have character information regarding select portions of the learning language.

27 Claims, 5 Drawing Sheets

(51) Int. Cl.
*G09B 5/12* (2006.01)
*G09B 7/04* (2006.01)
*G10L 15/187* (2013.01)
*G10L 15/22* (2006.01)
*G09B 19/04* (2006.01)
*G09B 7/02* (2006.01)
*G10L 25/51* (2013.01)
*G10L 17/00* (2013.01)

(52) U.S. Cl.
CPC ............... *G09B 7/04* (2013.01); *G09B 19/04* (2013.01); *G10L 15/187* (2013.01); *G10L 15/22* (2013.01); *G10L 25/51* (2013.01); *G10L 17/00* (2013.01); *G10L 2015/221* (2013.01)

(58) Field of Classification Search
CPC .... G09B 7/00; G09B 5/12; G09B 5/14; G10L 15/08; G10L 2021/105; G10L 25/51; G10L 17/00
See application file for complete search history.

(56) References Cited

U.S. PATENT DOCUMENTS

| | | | | |
|---|---|---|---|---|
| 2009/0319270 A1* | 12/2009 | Gross | ...................... | G10L 15/22 704/246 |
| 2012/0214141 A1* | 8/2012 | Raya | ........................ | G09B 5/06 434/185 |
| 2013/0130211 A1* | 5/2013 | Dohring | .................. | G09B 5/06 434/157 |

FOREIGN PATENT DOCUMENTS

| | | |
|---|---|---|
| JP | 2005-024815 A | 1/2005 |
| JP | 2005-031207 A | 2/2005 |
| JP | 2006-195094 A | 7/2006 |
| JP | 2011-128362 A | 6/2011 |
| JP | 2014-240902 A | 12/2014 |
| JP | 2015-036788 A | 2/2015 |

* cited by examiner

LANGUAGE LEARNING SYSTEM, LANGUAGE LEARNING SUPPORT SERVER, AND COMPUTER PROGRAM PRODUCT

CROSS-REFERENCE TO RELATED APPLICATION

The present application is a continuation application of International Application No. PCT/JP2016/74052 filed Aug. 17, 2016 which is expressly incorporated herein by reference in its entirety.

BACKGROUND

Technical Field

The present invention relates to a language learning system and a language learning program that support a learner for learning a language, and especially, relates to a language learning system and a language learning program which implement sound and an image reflecting a performance result and which are suitable for learning pronunciation of a foreign language.

Related Art

As a conventional language learning support device that supports language learning so that a learner can efficiently learn a foreign language alone, various types of electronic devices such as a computer that support the learning by showing characters of a foreign language and by outputting voice (speech) are known.

As a language learning support device that supports the learning of accurate pronunciation of a foreign language, a pronunciation learning device is disclosed in Japanese Patent Publication No. 2015-36788. The pronunciation learning device enables easy learning of a proper separation of syllables and a rhythm of syllables by adding a syllable mark that shows a range for each syllable on display information such as a spelling and a phonetic sign of a word, and at the same time, by highlighting the syllable mark of the current syllable with respect to the display information with the syllable mark in synchronization with the syllable transition of a model pronouncing voice output. After the pronunciation learning device outputs a native pronouncing voice as a model, the pronunciation learning device can induce correct pronunciation of a learner by highlighting an accent and a syllable during a pronunciation period of the learner.

A learning system is disclosed in Japanese Patent Publication No. 2002-268537. The learning system enables learning of a foreign language without using characters by outputting a voice of a foreign language in synchronization with a display of an object by a computer, by causing a learner who listens to the voice to select an operation of the object corresponding to the voice, and by displaying or outputting with a voice an evaluation result after the suitability of the operation that the learner selected is judged.

However, in the pronunciation learning device that is disclosed in Japanese Patent Publication No. 2015-36788, because it is necessary to have a programming work to show display information such as a spelling and a phonetic sign of a word for each learning language in order to correspond to a plurality of learning languages, a workload increases in proportion to the number of corresponding languages. As a result, there is a problem in that there is a heavy burden corresponding to the plurality of learning languages.

Because the learning system that is disclosed in Japanese Patent Publication No. 2002-268537 enables learning of a foreign language without using characters, the problem explained above does not occur. However, because a level of understanding of a learner is only judged by the selected operation of the object, there still is a problem that it is not possible to confirm whether the learner learns a correct pronunciation of a foreign language.

SUMMARY

Thus, the present invention attempts to provide a language learning system and a language learning program that enable learning of a plurality of languages with less-burden and smaller-costs in regards to a language learning system that is suitable for pronunciation learning of a foreign language.

In order to solve the above problems, the present invention provides a language learning system that includes a learner terminal and a learning support server, the learner terminal has a display unit for displaying an image and a sound input/output unit (a sound recording and reproducing device) for inputting (recording) and outputting (emitting) voice, and the learning server supports a learner to learn a language and is connected to the learner terminal via a network. The language learning system has a voice storage means that stores a model voice of a word and/or a sentence that is a model pronunciation with respect to one or more languages that are to be a learning object, a voice transmission means that sends the model voice and an image corresponding to the model voice to the learner terminal so as to make the learner perceive the model voice and the image in relation to each other, a voice acquisition means that acquires the learner's voice uttered by the learner by requesting the learner to speak the word or the sentence corresponding to the image and by sending the image to the learner terminal, a voice analysis means that identifies the learner by analyzing the acquired learner's voice and at the same time, that evaluates pronunciation correctness, and an evaluation transmission means that sends an image indicating an evaluation result of the pronunciation correctness being evaluated by the voice analysis means to the learner terminal. The image does not have character information regarding the language that is to be the learning object.

Further, in the above mentioned language learning system according to the present invention, when the evaluation result of the pronunciation correctness satisfies a predetermined reference value, the evaluation transmission means sends the image indicating the evaluation result, and when the evaluation result of the pronunciation correctness does not satisfy the predetermined reference value, the voice transmission means repeatedly sends the model voice to the learner terminal.

Further, in the above mentioned language learning system according to the present invention, the voice transmission means has a means that makes the image change corresponding to the model voice so as to display the image in the display unit of the learner terminal after the means makes the model voice output from the sound input/output unit, and the evaluation transmission means has a means that makes the image change corresponding to the model voice so as to display the image in the display unit of the learner terminal when the evaluation result of the pronunciation correctness satisfies the predetermined reference value.

Further, in the above mentioned language learning system according to the present invention, the voice storage means has a means that stores model voice of a plurality of speakers in relation to each of the words and/or sentences, and the voice transmission means has a means that sends the model voice of the different speakers when the voice transmission means repeatedly sends the model voice to the learner terminal.

Further, in the above mentioned language learning system according to the present invention, the learning support server further includes a learning state storage means that stores the evaluation result of the pronunciation correctness with respect to the learned word and/or the sentence by each learner, a report preparation means that prepares a report, the report including learning progress, and good-performed or poorly-performed sound for each learner based on the evaluation result of the pronunciation correctness that is stored in the learning state storage means, and a curriculum preparation means that prepares a learning curriculum for each learner based on the report.

Further, in the above mentioned language learning system according to the present invention, the learning support server further includes a learner interaction means, and the learner interaction means classifies each learner into a plurality of learning levels based on the report for each learner and sends an image for providing a virtual reality environment for a plurality of learners in the same range of the learning level or in the same and adjacent ranges of the learning level to the learner terminal so as to enable the plurality of learners to have a conversation via voice.

Further, the present invention attempts to provide a language learning program that makes a computer realize the language learning system according to any one of the above language learning systems.

The language learning system according to the present invention includes a learner terminal and a learning support server, the learner terminal has a display unit for displaying an image and a sound input/output unit for inputting and outputting voice, and the learning server supports a learner to learn a language and is connected to the learner terminal via a network. The language learning system has a voice storage means that stores model voice of a word and/or a sentence that is model pronunciation with respect to one or more languages that are to be a learning object, a voice transmission means that sends the model voice and an image corresponding to the model voice to the learner terminal so as to make the learner perceive the model voice and the image in relation to each other, a voice acquisition means that acquires a learner's voice uttered by the learner by requesting the learner to speak the word or the sentence corresponding to the image and by sending the image to the learner terminal, a voice analysis means that identifies the learner by analyzing the acquired learner's voice and at the same time, that evaluates pronunciation correctness, and an evaluation transmission means that sends an image indicating an evaluation result of the pronunciation correctness being evaluated by the voice analysis means to the learner terminal. The image does not have character information regarding the language that is to be the learning object. Thus, because the learner learns the language by the image and the model voice, the learner can learn the correct pronunciation. Further, in regards to the language learning system according to the present invention, because the image that is sent to the learner terminal does not have the character information regarding a language that is to be the learning object, localization for showing the character corresponding to each language is unnecessary. Thus, the model voice of the plurality of languages can be stored in the voice storage means. As a result, it is effective to use for a different learning language by only changing the language of the model voice.

Further, in the above mentioned language learning system according to the present invention, when the evaluation result of the pronunciation accuracy satisfies a predetermined reference value, the evaluation transmission means sends the image indicating the evaluation result, and when the evaluation result of the pronunciation accuracy does not satisfy the predetermined reference value, the voice transmission means repeatedly sends the model voice to the learner terminal. Thus, when the learner pronounces correctly, the evaluation result can be reported to the learner by displaying the image that indicates the evaluation result on the display unit of the learner terminal, and when the learner pronounces incorrectly, by outputting the model voice again from the sound input/output unit of the learner terminal and by making the learner learn repeatedly, it is effective to learn the correct pronunciation.

Further, in the above mentioned language learning system according to the present invention, the voice transmission means has a means that makes the image change corresponding to the model voice so as to display the image in the display unit of the learner terminal after the means makes the model voice output from the sound input/output unit, and the evaluation transmission means has a means that makes the image change corresponding to the model voice so as to display the image in the display unit of the learner terminal when the evaluation result of the pronunciation accuracy satisfies the predetermined reference value. Thus, without having the character information in the image, it is effective to report the learner that the pronunciation is correct by making the image change in the same manner as the change corresponding to the model voice.

Further, in the above mentioned language learning system according to the present invention, the voice storage means has a means that stores model voice of a plurality of speakers in relation to each of the words and/or sentences, and the voice transmission means has a means that sends the model voice of the different speakers when the voice transmission means repeatedly sends the model voice to the learner terminal. Thus, because it makes the learner listen to the model voice of the different speaker in regards to the same word or sentence and makes the learner learn the correct pronunciation without making the leaner get bored, it is effective to improve learning efficiency.

Further, in the above mentioned language learning system according to the present invention, the learning support server further includes a learning state storage means that stores the evaluation result of the pronunciation accuracy with respect to the learned word and/or the sentence by each learner, a report preparation means that prepares a report, the report including learning progress, and good-performed or poorly-performed sound for each learner based on the evaluation result of the pronunciation accuracy that is stored in the learning state storage means, and a curriculum preparation means that prepares a learning curriculum for each learner based on the report. Thus, not only the learner or his/her guardian can be presented the result, but also the learning curriculum can be prepared in real time so that it is effective to have individualized effective learning. For example, the word or the sentence that has the poorly-performed sound is repeatedly learned based on the curriculum for each learner.

Further, in the above mentioned language learning system according to the present invention, the learning support server further includes a learner interaction means, and the learner interaction means classifies each learner into a plurality of learning levels based on the report for each learner and sends an image for providing a virtual reality environment for a plurality of learners in the same range of the learning level or in the same and adjacent ranges of the learning level to the learner terminal so as to enable the plurality of learners to have an oral conversation. Thus, it is effective to learn the language while promoting oral communications between the learners.

Further, the present invention attempts to provide a language learning program that makes a computer realize the language learning system according to any one of the above language learning systems. Thus, because the image that is sent to the learner terminal does not have the character information regarding a language that is to be the learning object, localization for showing the character corresponding to each language is unnecessary. Thus, the model voice of the plurality of languages can be stored in the voice storage means. As a result, it is effective to use for a different learning language by only changing the language of the model voice.

DESCRIPTION OF EXEMPLARY EMBODIMENTS

Figure 1:
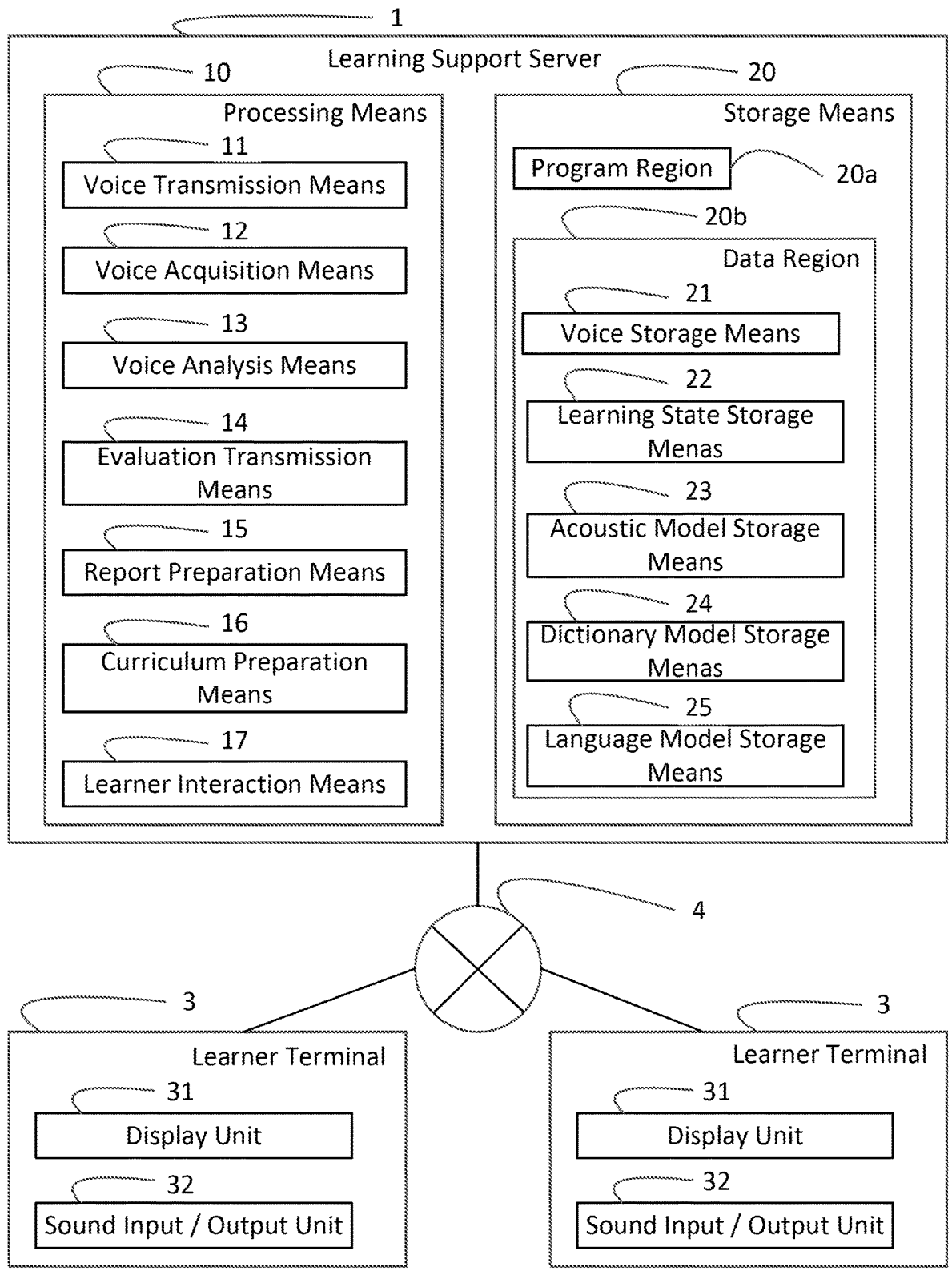
FIG. 1 is a block diagram that shows a language learning system according to an embodiment of the present invention.
Figure 2:
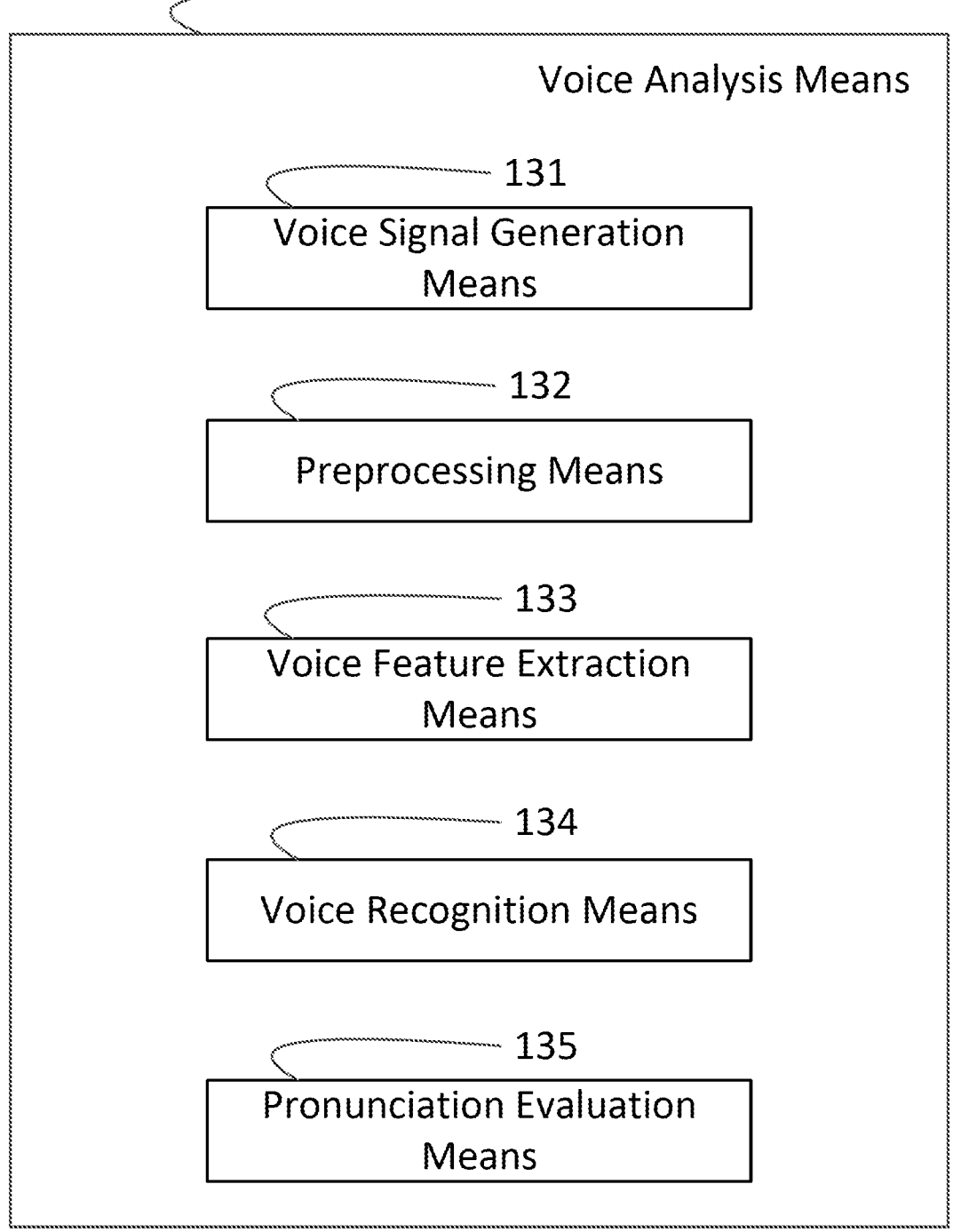
FIG. 2 is a block diagram that shows a voice analysis means of a language learning system according to an embodiment of the present invention.

An embodiment according to the present invention will be explained based on illustrated embodiments. FIG. 1 is a block diagram that shows a language learning system according to an embodiment of the present invention. FIG. 2 is a block diagram that shows a voice analysis means of a language learning system according to an embodiment of the present invention.

The language learning system according to the present invention is characterized to have a learning support server 1 supporting a learner for learning a language which is connected through a network 4 to a learner terminal 3 having a display unit 31 that displays an image and a sound input/output unit (a sound recording and reproduction device) 32 that inputs (records) and outputs (emits) voice. The learning support server 1 has a voice storage means 21 which stores model voice of a word and/or a sentence that is model pronunciation with respect to one or more languages that are to be a learning object, a voice transmission means 11 which sends the model voice and an image corresponding to the model voice to the learner terminal 3 so as to make the learner perceive the model voice and the image in relation to each other, a voice acquisition means 12 which acquires a learner's voice uttered by the learner by requesting the learner to utter of the word or the sentence corresponding to the image and by sending the image to the learner terminal 3, a voice analysis means 13 which identifies the learner by analyzing the acquired learner's voice and at the same time, which evaluates pronunciation correctness, and an evaluation transmission means 14 which sends an image indicating an evaluation result of the pronunciation correctness being evaluated by the voice analysis means to the learner terminal. The image does not have character information regarding the language that is to be the learning object. Learning language is considered as use of a non-declarative memory, not a declarative memory in psychology. Thus, when we learn a language correctly and efficiently, we should avoid using characters/letters in the displayed image for all processes of learning, explanation, and correction because the characters/letters will trigger a declarative memory. Specifically, characters/letters of the learning word should not be displayed as the displayed image. However, characters/letters for an instruction or simple information relating to language learning may be displayed as the displayed image. Of course, it is totally fine that the displayed image does not have any English characters/letters, but has only image/animation, when a learner is learning English.

In regard to the language learning system according to the present invention, the image, which is explained above and is sent to the learner terminal 3, includes a moving image in addition to a still image. As a specifically preferable embodiment according to the present invention, the image is an animation having a moving teacher object in which the character information regarding the language that is to be the learning object is not included. The language learning system according to the present invention does not need the localization of the animation, stores the model voice of the plurality of languages in the voice storage means, and can use for a different learning language by only changing the language of the model voice that is combined with the animation.

Further, the language learning system according to the present invention can make the learner learn a body language without any human interaction by making the teacher object move its hands and with gestures corresponding to the model voice.

First Embodiment

A learning support server 1 corresponds to a computer being connected to a network 4, and has a processing means 10 that supports a learner for learning a language according to a request from a learner terminal 3 and a storage means 20 that stores a program for making the processing means 10 work and data such as voice.

The processing means 10 works by a central processing unit (CPU (a processor)) that is provided in the learning support server 1, and one or more programs that define an operation procedure of the CPU. The storage means 20 has, for instance, a memory such as a ROM and a RAM, and a hard disk. The storage means 20 has a program region 20a in which a program for executing various processes of the processing means 10 is stored and a data region 20b that stores data such as voice data. Note that the program is configured by computer-readable instructions stored in the memory. Thus, the processor (CPU) can execute the computer-readable instructions to perform various processes explained below.

In the present embodiment, the storage means 20 has a voice storage means 21 that stores model voice of a word and a sentence that is model pronunciation regarding two or more languages that are to be the learning object, and a learning state storage means 22 that stores evaluation of pronunciation correctness of the word and the sentence being learned for each learner. Further, the storage means 20 has, as information for evaluating the pronunciation correctness, an acoustic model storage means 23 that indicates a frequency characteristic that a phoneme of the learning language has, a dictionary model storage means 24 that links a word of the learning language and an acoustic model, and a language model storage means 25 that indicates restriction related to an arrangement of the phonemes of the learning language.

The learner terminal 3 corresponds to a terminal that is connectable to the network 4, such as a personal computer, a tablet terminal, and a smartphone. The learner terminal 3 has a display unit 31 that displays the image such as the animation and a sound input/output unit (a sound recording and reproduction device 32 that is, for instance, made from a combination of a microphone (for recording) and a speaker, and can access the learning support server 1 through the network 4. However, any sound input/recording and output/reproduction device that is capable to input/record and output/emit voice can be used as the sound input/output unit 32 if the sound input/output unit 32 does not have a microphone and a speaker.

In the embodiment shown in FIG. 1 according to the present invention, the processing means 10 is configured with the voice transmission means 11, the voice acquisition means 12, the voice analysis means 13, the evaluation transmission means 14, a report preparation means 15, and a curriculum preparation means 16.

The voice transmission means 11 sends the model voice that is stored in the voice storage means 21 to the learner terminal 3 through the network 4, and makes the learner terminal 3 output it from the sound input/output unit 32, and at the same time, sends the animation corresponding to the model voice and makes the display unit 31 display, and makes the learner perceive the model voice and the image in relation to each other. This animation does not have character information regarding a language that is to be the learning object.

In the present embodiment, the voice transmission means 11 makes the display unit 31 of the learner terminal 3 display a teacher object, and at the same time, the animation that includes the image (for instance, an image of "apple") corresponding to the model voice. While the teacher object indicates the image corresponding to the model voice, the voice transmission means 11 makes the sound input/output unit 32 output the model voice (here, the voice of "apple"), and makes the learner perceive the model voice and the animation or the image (here, the image of "apple") that is included in the animation in relation to each other. At this time, in the display unit 31, characters (here, the letters of "apple") related to the language that is to be the learning object are not displayed.

The voice acquisition means 12 sends the animation corresponding to the model voice to the learner terminal 3 through the network 4, and makes the display unit 31 display it, and requests the learner to speak the word or the sentence (here, "apple") corresponding to the animation or the image that is included in the animation. The voice acquisition means 12 acquires the learner's voice that the learner utters from the sound input/output unit 32 through the network 4. It is preferred that, in the animation, the voice acquisition means 12 requests the utterance, for instance, while the teacher object indicates the image of "apple" corresponding to the model voice. Even at this time, on the display unit 31, the characters of "apple" related to the language that is to be the learning object are not displayed.

The voice analysis means 13 analyzes the learner's voice that is acquired from the learner terminal 3 through the network 4 so as to identify the learner, and at the same time, evaluates the pronunciation correctness. In the present embodiment, the voice analysis means 13 identifies the learner based on the learner's voice by using voice authentication. A voiceprint of each learner is stored in the learning state storage means 22 of the storage means 20 along with, for instance, a name of the learner.

In the present embodiment, the voice analysis means 13 has a voice signal generation means 131 that generates a voice signal by performing an A/D conversion of voice, a preprocessing means 132 that divides the generated voice signal, a voice feature extraction means 133 that extracts a frequency characteristic of the voice, a voice recognition means 134 that identifies a word or a speaker based on the voice, and a pronunciation evaluation means 135 that evaluates the pronunciation correctness.

The voice signal generation means 131 samples essential points of the voice data that is performed an A/D conversion by the learner terminal 3 and is obtained by the learning support server 1, and quantizes. The preprocessing means 132 amplifies the voice signal and divides it in a frame so as to perform a window processing. The voice feature extraction means 133 performs a fast Fourier transformation (FFT processing) on the voice signal so as to calculate a logarithmic value by applying a Mel-Filter Bank, and performs a discrete cosine transformation (DCT processing) and a ground difference conversion so as to extract the frequency characteristic of the voice.

The voice recognition means 134 has a learner identification means that identifies the learner by collating a frequency characteristic of the voice with a voiceprint for each learner that is stored in the storage means 20, and a decoding means that decodes the frequency characteristic of the voice into a word. The pronunciation evaluation means 135 calculates an acoustic score that evaluates correctness of a sound and a language score that evaluates correctness of a language based on an acoustic model, a dictionary model and a language model that are stored in the storage means 20, evaluates the pronunciation correctness of the learner, and stores this evaluation result in the learning state storage means 22.

The evaluation transmission means 14 sends an image that indicates the evaluation result of the pronunciation correctness that is evaluated by the voice analysis means 13 to the learner terminal 3. The image that indicates this evaluation result is preferable not to include a letter, and can also indicate the evaluation content by, for instance, a graph or a mark. Further, the image that indicates this evaluation result can also be displayed in the animation, and it is the most preferred that the teacher object shows the evaluation result for the learner's utterance with gestures. In the present embodiment, only when the evaluation result of the pronunciation correctness satisfies a predetermined reference value, the evaluation transmission means 14 sends the image that indicate the evaluation result to the learner terminal 3. On the other hand, when the evaluation result of the pronunciation correctness does not satisfy the predetermined reference value, the voice transmission means 11 repeatedly sends the model voice and the animation corresponding to the model voice to the learner terminal 3 and makes the learner perceive the model voice and the animation or the image that is included in the animation in relation to each other. Alternatively, when the evaluation result of the pronunciation correctness does not satisfy the predetermined reference value, the voice transmission means 11 prompts the learner to speak a learning word ("apple") again by displaying the corresponding animation in the learner terminal 3.

In the present embodiment, the voice storage means 21 has a means that stores the model voice of a plurality of speakers in relation to each of the words and the sentences. When the voice transmission means 11 repeatedly sends the model voice to the learner terminal 3, the voice transmission means 11 has a means that sends the model voice of a speaker who is different from a previous speaker of the model voice that is previously sent. When the voice transmission means 11 repeatedly sends the same word or sentence, the voice transmission means 11 can change the speaker each time of sending, and can also change the speaker every two or three times of sending. Alternatively, the voice transmission means 11 sends the model voice of different ones of the plurality of speakers when the processor prompts the learner to speak again. Further, alternatively, when the voice transmission means 11 sends the model voice to the learner terminal 3 again, the voice transmission means 11 has a means that sends a new model voice spoken by the same speaker with a different emotion from the previous model voice spoken by the same speaker with an original emotion. Note that when a new model voice of a different speaker or a new voice model of the same speaker but with a different emotion can be sent to the learner terminal 3 when the evaluation result of the pronunciation correctness does satisfy and does not satisfy the predetermined reference value (both evaluation results).

The report preparation means 15 prepares a report that includes learning progress, and good-performed or poorly-performed sound for each learner based on the evaluation result of the pronunciation correctness that is stored in the learning state storage means 22, and stores this report in the learning state storage means 22. Further, the report preparation means 15 sends the prepared report to the learner terminal 3. Further, instead of the learner terminal 3 or in addition to the learner terminal 3, the report preparation means 15 can also send the report to a terminal for a guardian.

The curriculum preparation means 16 prepares a learning curriculum for each learner based on the report that is stored in the learning state storage means 22, and stores this learning curriculum in the learning state storage means 22. Further, the curriculum preparation means 16 can also revise the learning curriculum based on the pronunciation correctness during language learning.

In the present embodiment, the processing means 10 is preferable to have a learner interaction means 17 that classifies each learner into a plurality of learning levels based on the report for each learner, sends an animation in order to provide a virtual reality environment for a plurality of learners in the same range of the learning level or in the same and adjacent ranges of the learning level to the learner terminal 3 so as to enable the plurality of learners have a conversation via voice. Even in this case, the voice analysis means 13 is configured to identify the learner by analyzing the learner's voice, and at the same time, evaluate the pronunciation correctness, and point out a pronunciation error.

Further, the configuration of the language learning system according to the present invention is not limited to the embodiment, and can also be adopted various other embodiments.

Flow of the Language Learning

Figure 3:
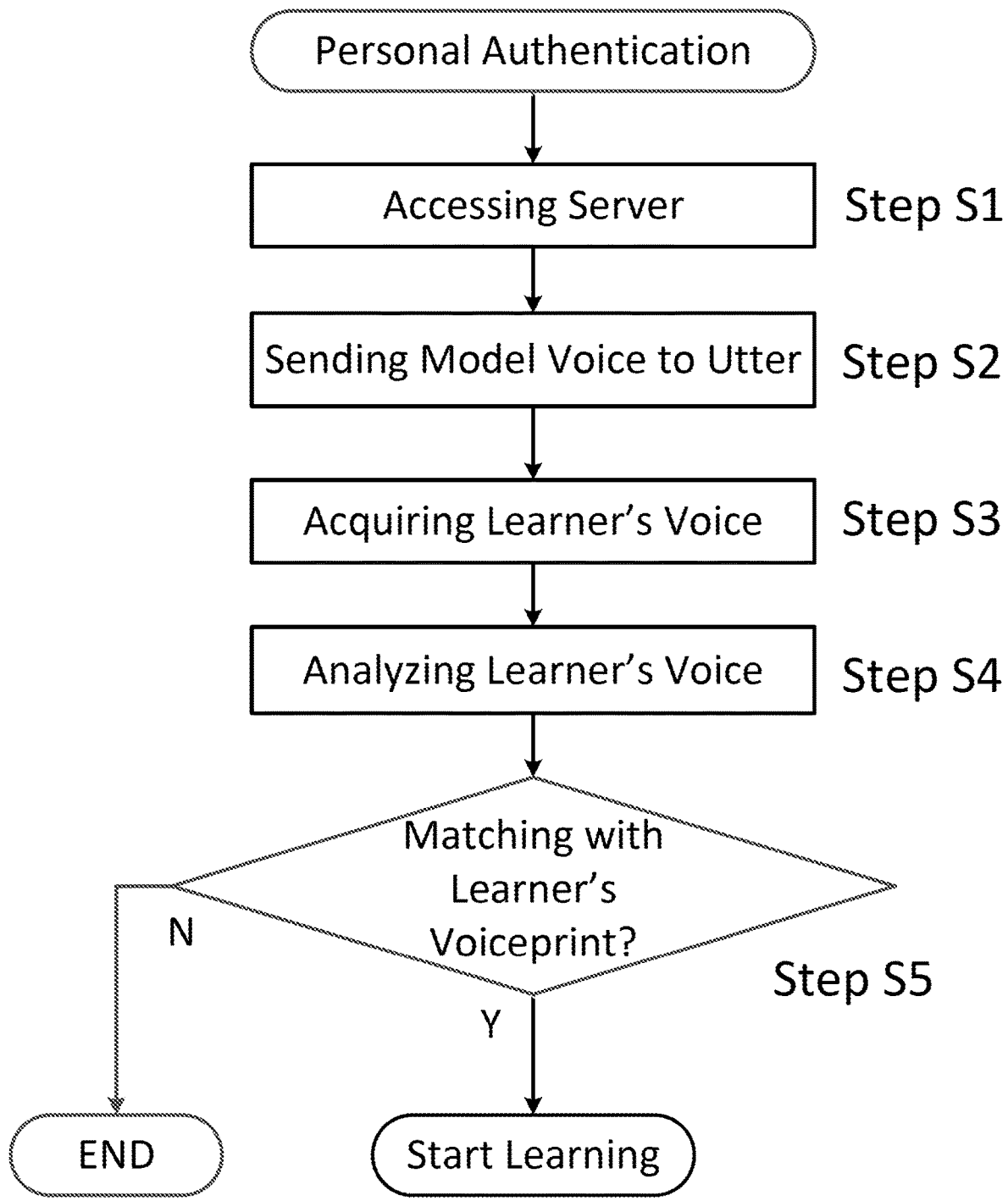
FIG. 3 is a flow diagram that shows an example of a personal authentication of a language learning system according to the present invention.
Figure 4:
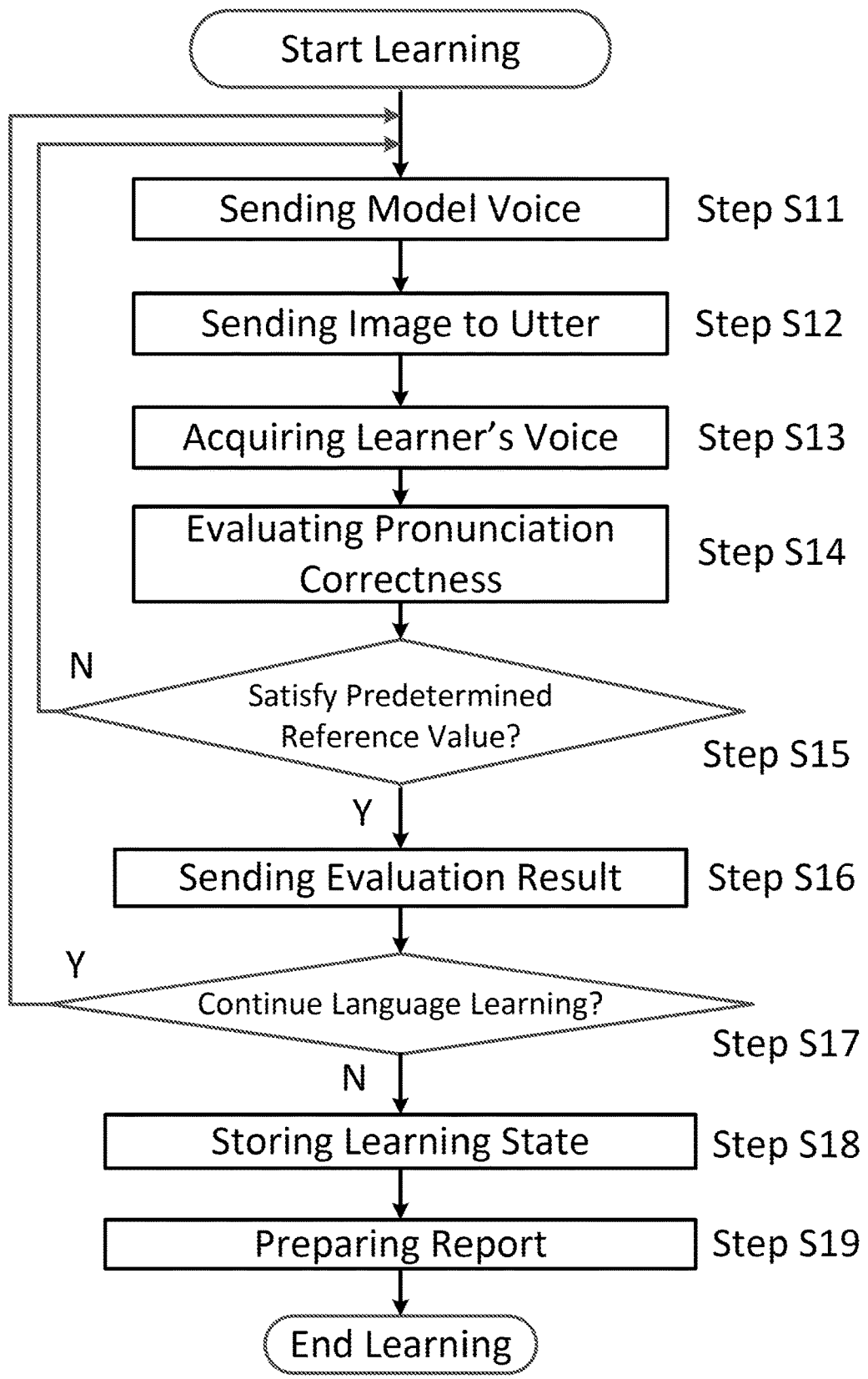
FIG. 4 is a flow diagram that shows an example of learning support of a language learning system according to the present invention.
Figure 5:
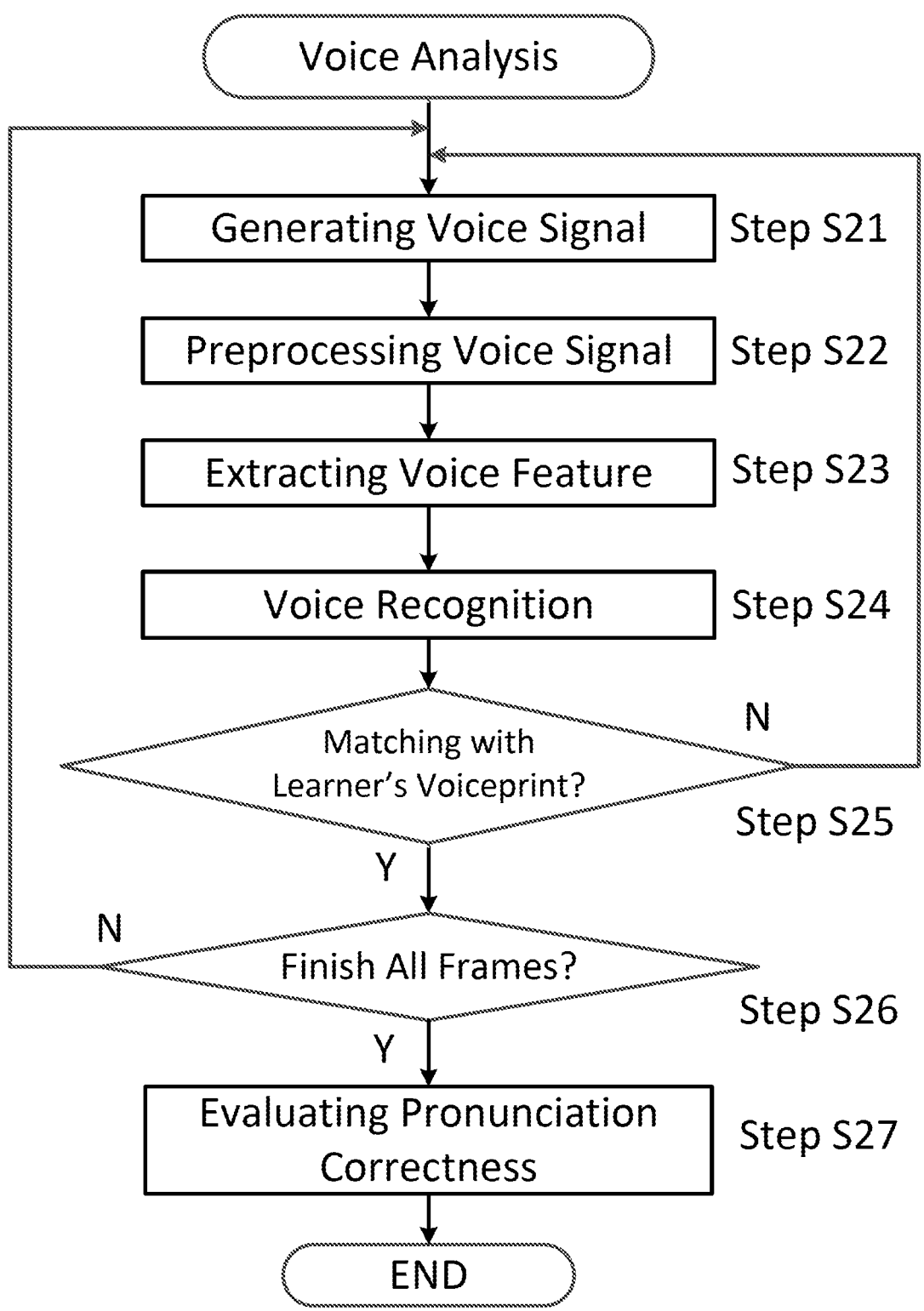
FIG. 5 is a flow diagram that shows an example of voice analysis according to the present invention.

An operation of the language learning system according to the embodiment of the present invention will be explained with reference to FIGS. 3-5. FIG. 3 is a flow diagram that shows an example of a personal authentication of the language learning system according to the present invention. FIG. 4 is a flow diagram that shows an example of learning support of the language learning system according to the present invention. FIG. 5 is a flow diagram that shows an example of a voice analysis of the language learning system according to the present invention. Here, a case in which a learner learns an English pronunciation will be explained, however, the cases of other languages are in the same manner.

Personal Authentication

First, an example of a personal authentication of the language learning system according to the present invention will be explained with reference to FIG. 3. A learner selects, for instance, an icon that is displayed on the display unit 31 of the learner terminal 3, starts an application program to access to the learning support server 1 (Step S1). In the present embodiment, the learner terminal 3 accesses a function for supporting the English pronunciation learning in the learning support server 1.

In the learning support server 1 that receives the access from the learner terminal 3, the processing means 10 supports the English pronunciation learning according to the requirement from the learner terminal 3. First, while an animation including, for instance, a teacher object as an initial animation is displayed on the display unit 31 of the learner terminal 3, the processing means 10 makes the sound input/output unit 32 of the learner terminal 3 output the model voice of an initial greeting such as "Hello!" (Step S2). At this time, the teacher object is preferable to use gestures so as to urge the learner to utter.

When the learner greets by pronouncing "Hello!" in a same manner, the processing means 10 acquires the learner's voice that is input from the sound input/output unit 32 of the learner terminal 3 (Step S3), and performs a voiceprint authentication by analyzing this learner's voice (Step S4). An analysis procedure of the learner's voice will be explained later.

The processing means 10 collates the voiceprint that is obtained by analyzing the learner's voice with the voiceprint of a registrant that is stored in the storage means 20 in advance, and identifies the learner (Step S5). The processing means 10 acquires registration information of the voiceprint that corresponds to the voiceprint of the acquired learner's voice. At this time, the processing means 10 can also authenticate the learner by making the teacher object utter the name of the learner or by making the display unit 31 display an authentication image that the learner registered in advance.

When the processing means 10 authenticates the learner, the processing means 10 performs the learning curriculum of the learner that is prepared based on the evaluation result of the pronunciation correctness of the words and the sentences that are learned by the learner and that are stored in the learning state storage means 22. On the other hand, when there is no voiceprint that corresponds to the voiceprint of the acquired learner's voice, the processing means 10 sends error information to the learner terminal 3 and finishes the authentication processing.

Performance of the Learning Curriculum

Next, an example of the learning support of the language learning system according to the present invention will be explained with reference to FIG. 4. The processing means 10 sends the model voice and the amination corresponding to the model voice of English that is the learning language to the learner terminal 3 by the voice transmission means 11, and makes the learner perceive the model voice and the animation or the image that is included in the animation in relation to each other (Step S11). Specifically, the voice transmission means 11 makes the display unit 31 of the learner terminal 3 display the animation including the image (for instance, the image of "apple") corresponding to the model voice together with the teacher object, makes the sound input/output unit 32 output the model voice (here, the voice of "apple") while the teacher object indicates the image, and makes the learner perceive the model voice and the image that is included in the animation in relation to each other.

Next, the processing means 10 sends only the animation by the voice acquisition means 12 to the learner terminal 3 without sending the model voice, makes the display unit 31 display the animation including the image of "apple", and requests the learner the to speak the English word of "apple" corresponding to the image of "apple" (Step S12). At this time, the processing means 10 sends the animation in which the teacher object requests the utterance while indicating the image of "apple" to the learner terminal 3.

When the learner utters "apple" toward the learner terminal 3, the processing means 10 acquires the learner's voice that is input from the sound input/output unit 32 of the learner terminal 3 (Step S13). The learner's voice that is input from the sound input/output unit 32 is performed with the A/D conversion by a processing unit of the learner terminal 3 and is sent to the learning support server 1 via the network 4. The processing means 10 temporarily stores the acquired learner's voice in the storage means 20.

The processing means 10 evaluates the pronunciation correctness by analyzing the acquired learner's voice by the voice analysis means 13 (Step S14). The voice analysis means 13 identifies the learner's voice that is authenticated in Step S4 based on the acquired voice and evaluates the pronunciation correctness of the voice of this learner. An evaluation procedure of the learner's voice will be explained later.

The processing means 10 compares the evaluation result of the pronunciation correctness that is evaluated by the voice analysis means 13 with a predetermined reference value that is set in advance (Step S15). When the evaluation result of the pronunciation correctness satisfies the predetermined reference value, the processing means 10 sends the image or the animation including the image that shows the evaluation result of the pronunciation correctness being evaluated by the voice analysis means 13 to the learner terminal 3 by the evaluation transmission means 14, and makes the display unit 31 display it (Step S16). Specifically, in regards to the evaluation transmission means 14, the teacher object indicates the evaluation result with gestures by reacting to the utterance of the learner. For instance, the evaluation result differences can be indicated by a size of the gesture of the teacher object, and the larger the gesture is, the higher the evaluation result is.

On the other hand, when the evaluation result of the pronunciation correctness does not satisfy the predetermined reference value, the processing means 10 returns to Step S11, and by the voice transmission means 11, resends the model voice and the amination corresponding the model voice of English that is the learning language to the learner terminal 3, and makes the learner perceive the model voice and the animation or the image that is included in the animation in relation to each other. At this time, the voice transmission means 11 can also send a model voice of a speaker who is different from a speaker of the model voice that is the most recently sent.

When the evaluation result of the pronunciation correctness satisfies the predetermined reference value, the processing means 10 sends the model voice of a next word or sentence to the learner terminal 3 based on the learning curriculum of the learner and repeatedly performs the process from Step S11 to Step S16 until the language learning is finished (Step S17).

When the language learning based on the learning curriculum is finished, or when the learner selects ending of the language learning at the learner terminal 3, the processing means 10 stores the evaluation result of the pronunciation correctness of the learned words and the sentences in the learning state storage means 22 (Step S18).

Further, the processing means 10 prepares a report including learning progress and good-performed or poorly-performed sound of the learner by the report preparation means 15 based on the evaluation results of the pronunciation correctness that are stored in the learning state storage means 22 and stores it in the storage means 20, and at the same time, sends the report to the learner terminal 3 (Step S19). Further, instead of the learner terminal 3 or in addition to the learner terminal 3, the processing means 10 can also send the report to the terminal for a guardian. At this time, the processing means 10 can also send the report to the terminal for the guardian on a regular basis such as once a month.

Further, the processing means 10 prepares the learning curriculum for each learner based on the report that is prepared by the report preparation means 15 and stores it in the storage means 20. Further, the processing means 10 can also revise the learning curriculum based on the pronunciation correctness during the language learning.

Analysis of the Learner's Voice

An example of the voice analysis of the language learning system according to the present invention will be explained with reference to FIG. 5. The processing means 10 acquires sound data that is input from the sound input/output unit 32 of the learner terminal 3 and that is performed with an A/D conversion, performs sampling of voice parts from this sound data, quantizes it, and generates a voice signal of the learner (Step S21).

The processing means 10 amplifies the voice signal and divides it in a frame so as to perform a window processing by a preprocessing means (Step S22). Further, the processing means 10 performs a fast Fourier transformation (FFT processing) on the voice signal so as to calculate a logarithmic value by applying a Mel-Filter Bank, and performs a discrete cosine transformation (DCT processing) and a ground difference conversion so as to extract a frequency characteristic of the voice by a voice feature extraction means (Step S23).

The processing means 10 collates the frequency characteristic of the voice with the voiceprint for each learner that is stored in the storage means 20 so as to identify the learner by a voice recognition means (Step S24). In regards to the personal authentication explained above, the processing means 10 performs an additional authentication procedure for the identified learner when needed and finishes the personal authentication processing. Further, in regards to the learning curriculum, the processing means 10 decides whether the frequency characteristic of the voice corresponds to the authenticated voiceprint of the learner or not (Step S25) and repeatedly performs the processing from Step S21 to Step S25 when they do not correspond.

In regards to the learning curriculum, the processing means 10 decodes the frequency characteristic of the voice into a corresponding phoneme by the voice recognition means (Step S24). In Step S25, when the frequency characteristic of the voice corresponds to the authenticated voiceprint of the learner, the processing means 10 repeatedly performs the processing from Step S23 to Step S24 until the decoding of the frequency characteristic of the voice of all the frames into the corresponding phonemes is finished (Step S26).

When the decoding of the frequency characteristic of the voice of all the frames into the corresponding phonemes is finished, the processing means 10 calculates an acoustic score that evaluates the correctness of the sound and a language score that evaluates the correctness of the language based on the acoustic model, the dictionary model and the language model that are stored in the storage means 20, and evaluates the pronunciation correctness of the learner by a pronunciation evaluation means (Step S27).

Second Embodiment

As another embodiment according to the present invention, after the voice transmission means 11 makes the sound input/output unit (the recording and reproduction device) 32 of the learner terminal 3 output the model voice, the voice transmission means 11 has a means that makes the display unit 31 of the learner terminal 3 display an image which is changed or is simultaneously changed in correspond with the model voice. At this time, when the evaluation result of the pronunciation correctness satisfies a predetermined reference value, the evaluation transmission means 14 has a means that makes the display unit 31 of the learner terminal 3 display the image which is changed or is simultaneously changed in correspond with the model voice. This image includes a moving image and a plurality of still images that are changed quickly other than a single still image, and it is preferred that the changed image is an amination that corresponds to the model voice.

Specifically, the voice transmission means 11 makes the display unit 31 of the learner terminal 3 display the amination including the teacher object so as to make the sound input/output unit 32 output the voice of the language, for instance, an instruction and expressing emotion that are uttered by the teacher object. Further, the voice transmission means 11 makes it display an amination in which an image is changed in correspond with the language such as the instruction and the expressing emotion so as to make the learner perceive the model voice and the change of the image (an action corresponding to the instruction and the expression emotion) in relation to each other.

For instance, the voice transmission means 11 makes the display unit 31 of the learner terminal 3 display the amination that includes a student object in addition to the teacher object. The voice transmission means 11 makes the teacher object utter the model voice of "Clap Your Hands" and makes it display the animation in which the student object claps the hands in correspond with the model voice so as to make the learner perceive the instruction sentence of "Clap Your Hands" of the learning language and the action of "clapping the hands" that corresponds to this instruction in relation to each other.

The voice acquisition means 12 sends only the animation that includes the teacher object and the student object to the learner terminal 3 without sending the voice model and requests the learner to utter "Clap Your Hands." At this time, the voice acquisition means 12 can also make the teacher object use gestures of requiring the utterance.

When the pronunciation correctness that is evaluated by the voice analysis means 13 satisfies the predetermined reference value, the evaluation transmission means 14 makes the display unit 31 of the learner terminal 3 display the image that is changed in correspond with the model voice. At this time, the evaluation transmission means 14 makes the display unit 31 display the animation (the student object claps the hands) corresponding to the model voice of "Clap Your hands." Further, the evaluation result differences can also be indicated by a size of the gesture of the teacher object. The other configurations are the same as the configurations of the first embodiment.

In regards to a language learning system that is suitable for learning pronunciation of a foreign language, the present invention is useful for providing a language learning system which implements sound and an image reflecting a performance result and which is suitable for learning a plurality of languages with a less-burden and a small-cost.

The language learning system and the language learning program being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A language learning system comprising:
  a learner terminal, the learner terminal including:
    a display that is configured to display a learning image and an evaluation image; and
    a sound recording and reproduction device that is configured to record and emit sound;
  a learning support server, the learning support server including:
    a memory that is configured to store computer-readable instructions; and
    a processor that is configured to execute the computer-readable instructions so as to:
      cause the memory to store a model voice of a word or a sentence that is model pronunciation with respect to a learning language;
      send the model voice and the learning image to the learner terminal;
      acquire a learner voice spoken by a learner of the word or the sentence, the word or the sentence of the acquired learner voice corresponding to the sent learning image;
      identify the learner by analyzing the acquired learner voice and evaluate a pronunciation correctness of the acquired learner voice; and
      send the evaluation image indicating an evaluation result of the pronunciation correctness to the learner terminal; and
  a network that is communicably connected between the learner terminal and the learning support server,
  wherein each of the learning image and the evaluation image is displayed on the display without having character information regarding select portions of the word or the sentence corresponding to the sent model voice with respect to the learning language,
  wherein, when the evaluation result of the pronunciation correctness satisfies a predetermined reference value, the processor is configured to send the evaluation image indicating the evaluation result to the learner terminal, and
  when the evaluation result of the pronunciation correctness does not satisfy the predetermined reference value, the processor is configured to prompt the learner to speak again.

2. The language learning system according to claim 1,
wherein the processor is configured to cause the learning image to simultaneously change corresponding to the model voice so as to display the simultaneously changed learning image in the display of the learner terminal after the processor causes the model voice to be output from the sound recording and reproduction device, and the processor is configured to cause the learning image to change corresponding to the model voice so as to display the changed learning image in the display of the learner terminal when the evaluation result of the pronunciation correctness satisfies the predetermined reference value.

3. The language learning system according to claim 1,
wherein the memory is configured to store model voices of a plurality of speakers in relation to the word or the sentence, and the processor is configured to send the model voice of a different one of the plurality of speakers when the processor prompts the learner to speak again.

4. The language learning system according to claim 1,
wherein the processor is further configured to:
cause the memory to store the evaluation result of the pronunciation correctness with respect to the word or the sentence with respect to the learner;
prepare a report for the learner, the report including learning progress, good-performed sounds, and/or poorly-performed sounds based on the evaluation results of the pronunciation correctness; and
prepare a learning curriculum for the learner based on the report.

5. The language learning system according to claim 4,
wherein the learner terminal is one of a plurality of learner terminals that are used by a plurality of learners, and the plurality of learner terminals are connected to the learning support server via the network, the processor is configured to prepare the report for each of the plurality of learners, and wherein the processor is further configured to classify each of the plurality of learners into a plurality of learning levels based on the report for each of the plurality of learners and send a virtual reality image for providing a virtual reality environment for the plurality of learners in a same range of the learning level or in same and adjacent ranges of the learning level to the plurality of learner terminals.

6. The language learning system according to claim 1,
wherein each of the learning image and the evaluation image is displayed on the display without having character information of the word or the sentence corresponding to the sent model voice regarding the learning language.

7. The language learning system according to claim 1,
wherein the evaluation image is an animation.

8. The language learning system according to claim 1,
wherein the evaluation image corresponds to a teacher object's gesture.

9. The language learning system according to claim 1,
wherein the memory of the learning support server is further configured to store an original learning curriculum for the learner, and the processor is further configured to:
store the evaluation result of the pronunciation correctness of the acquired learner voice into the memory of the learning support server;
revise the original learning curriculum based on the evaluation result and create a revised learning curriculum; and
store the revised learning curriculum into the memory of the learning support server.

10. A language learning support server, which is communicably connectable to a learner terminal via a network, the language learning support server comprising:
a memory that is configured to store computer-readable instructions; and
a processor that is configured to execute the computer-readable instructions so as to:
cause the memory to store a model voice of a word or a sentence that is model pronunciation with respect to a learning language;
send the model voice and a learning image to the learner terminal;
acquire a learner voice spoken by a learner of the word or the sentence, the word or the sentence of the acquired learner voice corresponding to the sent learning image;
identify the learner by analyzing the acquired learner voice and evaluate a pronunciation correctness of the acquired learner voice; and
send an evaluation image indicating an evaluation result of the pronunciation correctness to the learner terminal,
wherein each of the learning image and the evaluation image does not have character information regarding select portions of the word or the sentence corresponding to the sent model voice with respect to the learning language,
wherein, when the evaluation result of the pronunciation correctness satisfies a predetermined reference value, the processor is configured to send the evaluation image indicating the evaluation result to the learner terminal, and
when the evaluation result of the pronunciation correctness does not satisfy the predetermined reference value, the processor is configured to prompt the learner to speak again.

11. The language learning support server according to claim 10,
wherein the processor is configured to cause the learning image to simultaneously change corresponding to the model voice so as to display the simultaneously changed learning image in a display of the learner terminal after the processor causes the model voice to be output from a sound recording and reproduction device of the learner terminal, and the processor is configured to cause the learning image to change corresponding to the model voice so as to display the changed learning image in the display of the learner terminal when the evaluation result of the pronunciation correctness satisfies the predetermined reference value.

12. The language learning support server according to claim 10,
wherein the memory is configured to store model voices of a plurality of speakers in relation to the word or the sentence, and the processor is configured to send the model voice of a different one of the plurality of speakers when the processor prompts the learner to speak again.

13. The language learning support server according to claim 10,
wherein the processor is further configured to:

cause the memory to store the evaluation result of the pronunciation correctness with respect to the word or the sentence with respect to the learner;

prepare a report for the learner, the report including learning progress, good-performed sounds, and/or poorly-performed sounds based on the evaluation results of the pronunciation correctness; and prepare a learning curriculum for the learner based on the report.

14. The language learning support server according to claim 13, wherein the learner terminal is one of a plurality of learner terminals that are used by a plurality of learners, and the plurality of learner terminals are connected to the learning support server via the network, the processor is configured to prepare the report for each of the plurality of learners, and wherein the processor is further configured to classify each of the plurality of learners into a plurality of learning levels based on the report for each of the plurality of learners and send a virtual reality image for providing a virtual reality environment for the plurality of learners in a same range of the learning level or in same and adjacent ranges of the learning level to the plurality of learner terminals.

15. The language learning support server according to claim 10, wherein each of the learning image and the evaluation image does not have character information of the word or the sentence corresponding to the sent model voice regarding the learning language.

16. The language learning support server according to claim 10, wherein the evaluation image is an animation.

17. The language learning support server according to claim 10, wherein the evaluation image corresponds to a teacher object's gesture.

18. The language learning support server according to claim 10, wherein the memory is further configured to store an original learning curriculum for the learner, and the processor is further configured to:
store the evaluation result of the pronunciation correctness of the acquired learner voice into the memory;
revise the original learning curriculum based on the evaluation result and create a revised learning curriculum; and
store the revised learning curriculum into the memory.

19. A computer program product embodying computer-readable instructions stored on a non-transitory computer-readable medium in which a program stored for causing a processor to execute the computer-readable instructions so as to perform the steps of:

causing a memory to store a model voice of a word or a sentence that is model pronunciation with respect to a learning language;

sending the model voice and a learning image to a learner terminal;

acquiring a learner voice spoken by a learner of the word or the sentence, the word or the sentence of the acquired learner voice corresponding to the sent learning image;

identifying the learner by analyzing the acquired learner voice and evaluate a pronunciation correctness of the acquired learner voice; and sending an evaluation image indicating an evaluation result of the pronunciation correctness to the learner terminal, wherein each of the learning image and the evaluation image does not have character information regarding select portions of the word or the sentence corresponding to the sent model voice with respect to the learning language, wherein, when the evaluation result of the pronunciation correctness satisfies a predetermined reference value, the processor is configured to send the evaluation image indicating the evaluation result to the learner terminal, and when the evaluation result of the pronunciation correctness does not satisfy the predetermined reference value, the processor is configured to prompt the learner to speak again.

20. The computer program product according to claim 19, wherein the processor is configured to cause the learning image to simultaneously change corresponding to the model voice so as to display the simultaneously changed learning image in a display of the learner terminal after the processor causes the model voice to be output from a sound recording and reproduction device of the learner terminal, and the processor is configured to cause the learning image to change corresponding to the model voice so as to display the changed learning image in the display of the learner terminal when the evaluation result of the pronunciation correctness satisfies the predetermined reference value.

21. The computer program product according to claim 19, wherein the memory is configured to store model voices of a plurality of speakers in relation to the word or the sentence, and the processor is configured to send the model voice of a different one of the plurality of speakers when the processor prompts the learner to speak again.

22. The computer program product according to claim 19, wherein the processor is further configured to:
cause the memory to store the evaluation result of the pronunciation correctness with respect to the word or the sentence with respect to the learner;
prepare a report for the learner, the report including learning progress, good-performed sounds and/or poorly-performed sounds based on the evaluation results of the pronunciation correctness; and
prepare a learning curriculum for the learner based on the report.

23. The computer program product according to claim 22, wherein the learner terminal is one of a plurality of learner terminals that are used by a plurality of learners, the processor is configured to prepare the report for each of the plurality of learners, and wherein the processor is further configured to classify each of the plurality of learners into a plurality of learning levels based on the report for each of the plurality of learners and send a virtual reality image for providing a virtual reality environment for the plurality of learners in a same range of the learning level or in same and adjacent ranges of the learning level to the plurality of learner terminals.

24. The computer program product according to claim 19, wherein each of the learning image and the evaluation image does not have character information of the word or the sentence corresponding to the sent model voice regarding the learning language.

25. The computer program product according to claim 19, wherein the evaluation image is an animation.

26. The computer program product according to claim 19, wherein the evaluation image corresponds to a teacher object's gesture.

27. The computer program product according to claim 19, wherein the processor is further configured to:
- store an original learning curriculum for the learner into the memory;
- store the evaluation result of the pronunciation correctness of the acquired learner voice into the memory;
- revise the original learning curriculum based on the evaluation result and create a revised learning curriculum; and
- store the revised learning curriculum into the memory.

\* \* \* \* \*